US012568424B2

(12) United States Patent
Ratnam et al.

(10) Patent No.: US 12,568,424 B2
(45) Date of Patent: Mar. 3, 2026

(54) METHOD AND APPARATUS FOR BUFFERED GROUP-ADDRESSED MANAGEMENT FRAME INDICATION

(71) Applicant: Samsung Electronics Co., Ltd., Suwon-si (KR)

(72) Inventors: Vishnu Vardhan Ratnam, Plano, TX (US); Boon Loong Ng, Plano, TX (US); Ahmed Atef Ibrahim Ibrahim, Plano, TX (US); Peshal Nayak, Plano, TX (US); Rubayet Shafin, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 18/177,110

(22) Filed: Mar. 1, 2023

(65) Prior Publication Data

US 2023/0292225 A1     Sep. 14, 2023

Related U.S. Application Data

(60) Provisional application No. 63/426,086, filed on Nov. 17, 2022, provisional application No. 63/319,167, filed on Mar. 11, 2022.

(51) Int. Cl.
*H04W 48/14*     (2009.01)
*H04W 28/02*     (2009.01)
(Continued)

(52) U.S. Cl.
CPC ....... *H04W 48/14* (2013.01); *H04W 28/0263* (2013.01); *H04W 72/56* (2023.01); *H04W 76/15* (2018.02)

(58) Field of Classification Search
CPC . H04W 28/0263; H04W 48/14; H04W 72/56; H04W 74/06; H04W 76/15
See application file for complete search history.

(56) References Cited

U.S. PATENT DOCUMENTS

| | | | | |
|---|---|---|---|---|
| 2018/0302922 A1* | 10/2018 | Patil | ...................... | H04W 76/11 |
| 2020/0396568 A1* | 12/2020 | Huang | .................. | H04W 76/40 |

(Continued)

FOREIGN PATENT DOCUMENTS

| | | |
|---|---|---|
| WO | 2021244652 A1 | 12/2021 |

OTHER PUBLICATIONS

Extended European Search Report issued Jan. 30, 2025 regarding Application No. 23767184.7, 8 pages.
Gan et al., "Group addressed frames delivery for MLO follow UP", doc.: IEEE 802.11-20/0902-03-00be, Dec. 2020, 12 pages.
International Search Report and Written Opinion issued Jun. 2, 2023 regarding International Application No. PCT/KR2023/003217, 8 pages.

(Continued)

*Primary Examiner* — Benjamin H Elliott, IV

(57)     ABSTRACT

Methods and apparatuses for supporting buffered group-addressed management frame indication are provided. A method of wireless communication performed by a non-access point (AP) multi-link device (MLD) comprises: receiving, from an AP of an AP MLD, a delivery traffic indication message (DTIM) beacon, the DTIM beacon comprising a traffic indication map (TIM) element; determining, based on the TIM element, whether group-addressed management frames are buffered at one or more other APs of the AP MLD; and prioritizing reception of one or more other DTIM beacons associated with the one or more other APs of the AP MLD based on whether the group-addressed management frames are buffered at the one or more other APs of the AP MLD.

14 Claims, 14 Drawing Sheets

(51) Int. Cl.
  *H04W 72/56*  (2023.01)
  *H04W 76/15*  (2018.01)

(56)          References Cited

U.S. PATENT DOCUMENTS

| | | | |
|---|---|---|---|
| 2021/0195497 A1* | 6/2021 | Ouzieli | H04W 12/108 |
| 2021/0250963 A1* | 8/2021 | Seok | H04W 72/12 |
| 2021/0298102 A1* | 9/2021 | Kwon | H04W 48/08 |
| 2022/0117020 A1* | 4/2022 | Cariou | H04W 48/12 |
| 2022/0182184 A1* | 6/2022 | Wang | H04L 1/1621 |
| 2023/0007585 A1* | 1/2023 | Jupudi | H04W 52/0216 |
| 2023/0071851 A1* | 3/2023 | Gan | H04W 72/30 |
| 2023/0126846 A1* | 4/2023 | Ratnam | H04W 84/12 |
| | | | 370/311 |
| 2023/0232276 A1* | 7/2023 | Chitrakar | H04L 5/0037 |
| 2023/0292225 A1* | 9/2023 | Ratnam | H04W 28/0263 |
| 2024/0114573 A1* | 4/2024 | Ko | H04W 76/15 |

OTHER PUBLICATIONS

Gan et al., "CR for Group addressed BUs by TIM", doc.: IEEE 802.11-22/0184r0, Mar. 2022, 11 pages.

Gan et al., "TBD and CR for Group addressed frames", doc.: IEEE 802.11-21/0740r1, Jun. 2021, 5 pages.

IEEE Standards Association; IEEE Std 802.11—2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.

IEEE P802.11be—D1.5; Draft Standard for Information technology—Telecommunications and information exchange between systems Local and metropolitan area networks—Specific requirements; "Part 11: Wireless LAN Medium Access Control (MAC) and Physical Layer (PHY) Specifications—Amendment 8: Enhancements for extremely high throughput (EHT)" Mar. 2022, 831 pgs.

* cited by examiner

1200

Receive the TIM element (and multi-link traffic indication element if applicable) in the DTIM beacon
1210

Determine if group-addressed management frames are buffered at other setup links with the AP MLD
1220

Prioritize reception of the DTIM beacon
1230

| Maximum Number of Simultaneous Links | SRS Support | TID-To-Link Mapping Negotiation Supported | Frequency Separation For STR/AP MLD Type Indication | AAR Support | ML Group Addressed BU Indication | Reserved |
|---|---|---|---|---|---|---|
| 4 | 1 | 2 | 3 | 1 | 1 | 2 |

Bits:

METHOD AND APPARATUS FOR BUFFERED GROUP-ADDRESSED MANAGEMENT FRAME INDICATION

CROSS-REFERENCE TO RELATED APPLICATION AND CLAIM OF PRIORITY

This application claims priority under 35 U.S.C. § 119(e) to U.S. Provisional Patent Application No. 63/319,167 filed on Mar. 11, 2022, and U.S. Provisional Patent Application No. 63/426,086 filed on Nov. 17, 2022, which are hereby incorporated by reference in their entirety.

TECHNICAL FIELD

This disclosure relates generally to transmission efficiency in wireless communications systems that include multi-link devices. Embodiments of this disclosure relate to methods and apparatuses for supporting buffered group-addressed management frame indication.

BACKGROUND

Wireless local area network (WLAN) technology allows devices to access the internet in the 2.4 GHZ, 5 GHZ, 6 GHZ, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-access point (AP) multi-link device (MLD) to discover, authenticate, associate, and set up multiple links with an AP MLD. Channel access and frame exchange is possible on each link between the AP MLD and non-AP MLD.

SUMMARY

Embodiments of the present disclosure provide methods and apparatuses for supporting buffered group-addressed management frame indication.

In one embodiment, a non-AP MLD is provided, comprising: a station comprising a transceiver configured to receive, from an AP of an AP MLD, a delivery traffic indication message (DTIM) beacon, the DTIM beacon comprising a traffic indication map (TIM) element. The non-AP MLD further comprises a processor operably coupled to the transceiver, the processor configured to: determine, based on the TIM element, whether group-addressed management frames are buffered at one or more other APs of the AP MLD; and prioritize reception of one or more other DTIM beacons associated with the one or more other APs of the AP MLD based on whether the group-addressed management frames are buffered at the one or more other APs of the AP MLD.

In another embodiment, a method of wireless communication performed by a non-AP MLD is provided. The method comprises: receiving, from an AP of an AP MLD, a DTIM beacon, the DTIM beacon comprising a TIM element; determining, based on the TIM element, whether group-addressed management frames are buffered at one or more other APs of the AP MLD; and prioritizing reception of one or more other DTIM beacons associated with the one or more other APs of the AP MLD based on whether the group-addressed management frames are buffered at the one or more other APs of the AP MLD.

In another embodiment, an AP MLD is provided, comprising: an AP comprising a transceiver. The AP MLD further comprises a processor operably coupled to the transceiver, the processor configured to: generate a DTIM beacon, the DTIM beacon comprising a TIM element; determine whether group-addressed management frames are buffered at one or more other APs of the AP MLD; and configure the TIM element based on whether the group-addressed management frames are buffered at the one or more other APs of the AP MLD, wherein the transceiver is configured to transmit the TIM element to a STA of a non-AP MLD.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure provide mechanisms for enabling a non-AP MLD to know whether group-addressed data and management frames are buffered for it at the AP MLD on the different enabled links.

Figure 1:
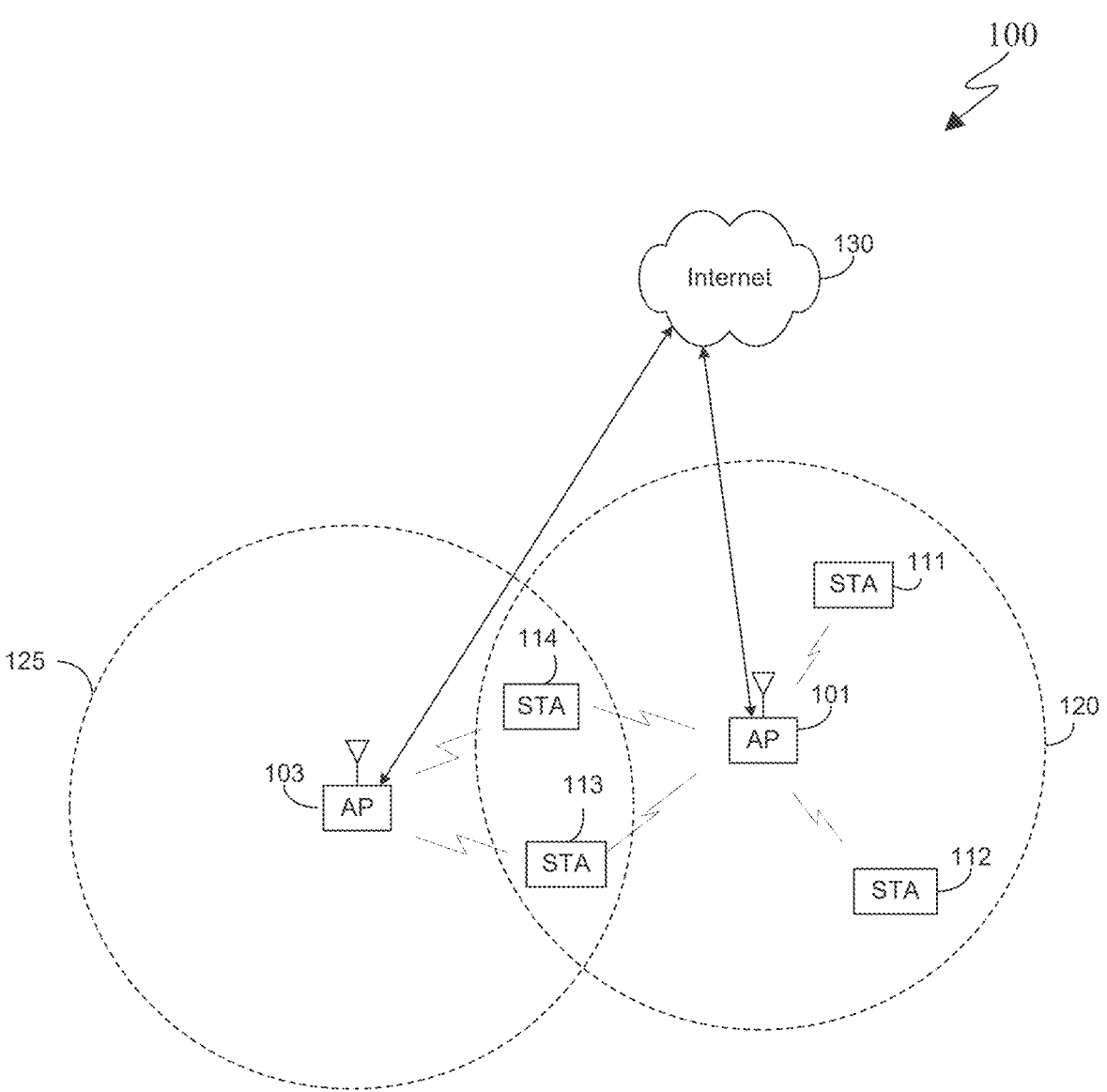
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for supporting buffered group-addressed management frame indication. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
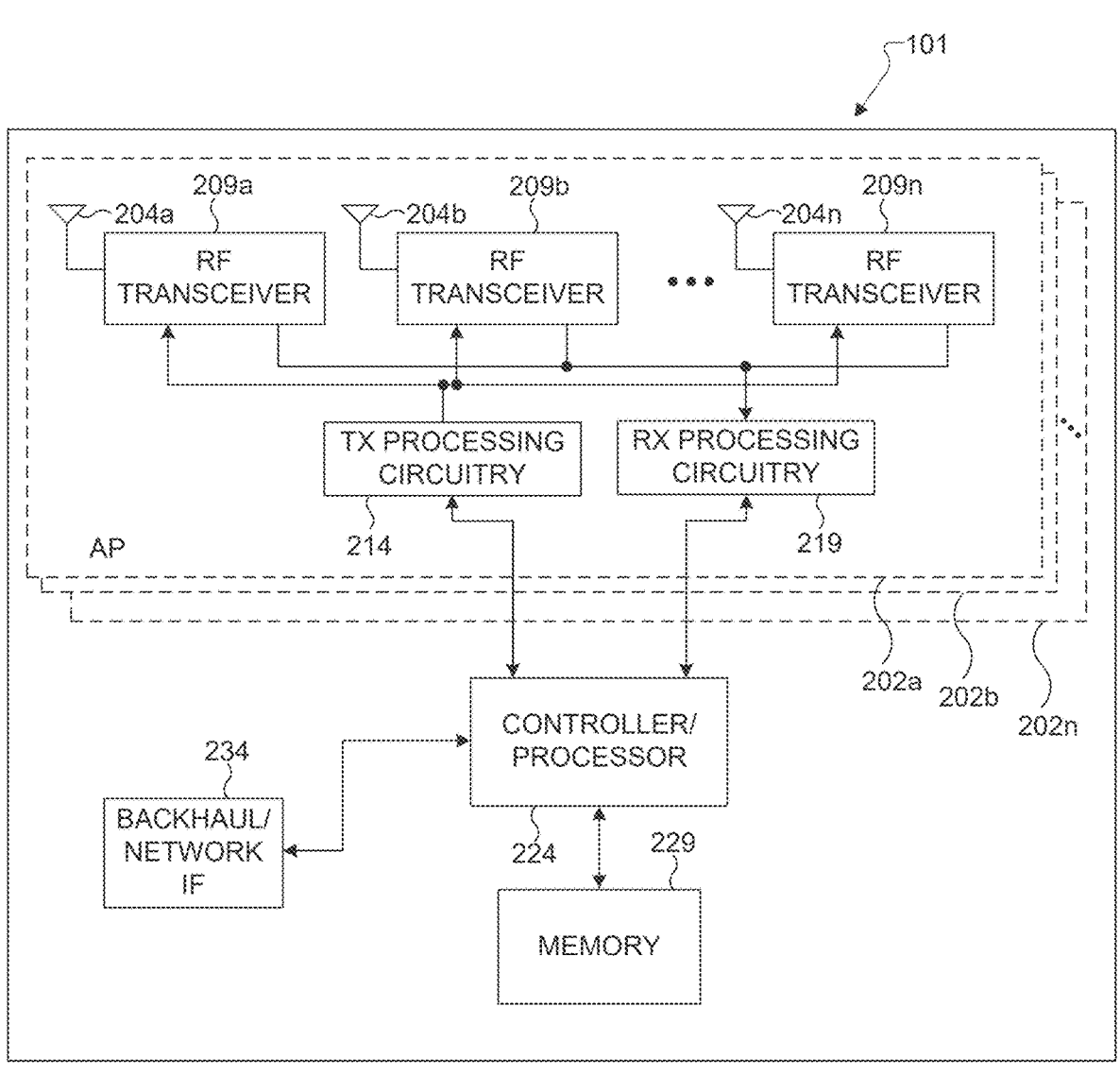
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHZ, or 6 GHZ, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHZ, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including supporting buffered group-addressed management frame indication. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for supporting buffered group-addressed management frame indication. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
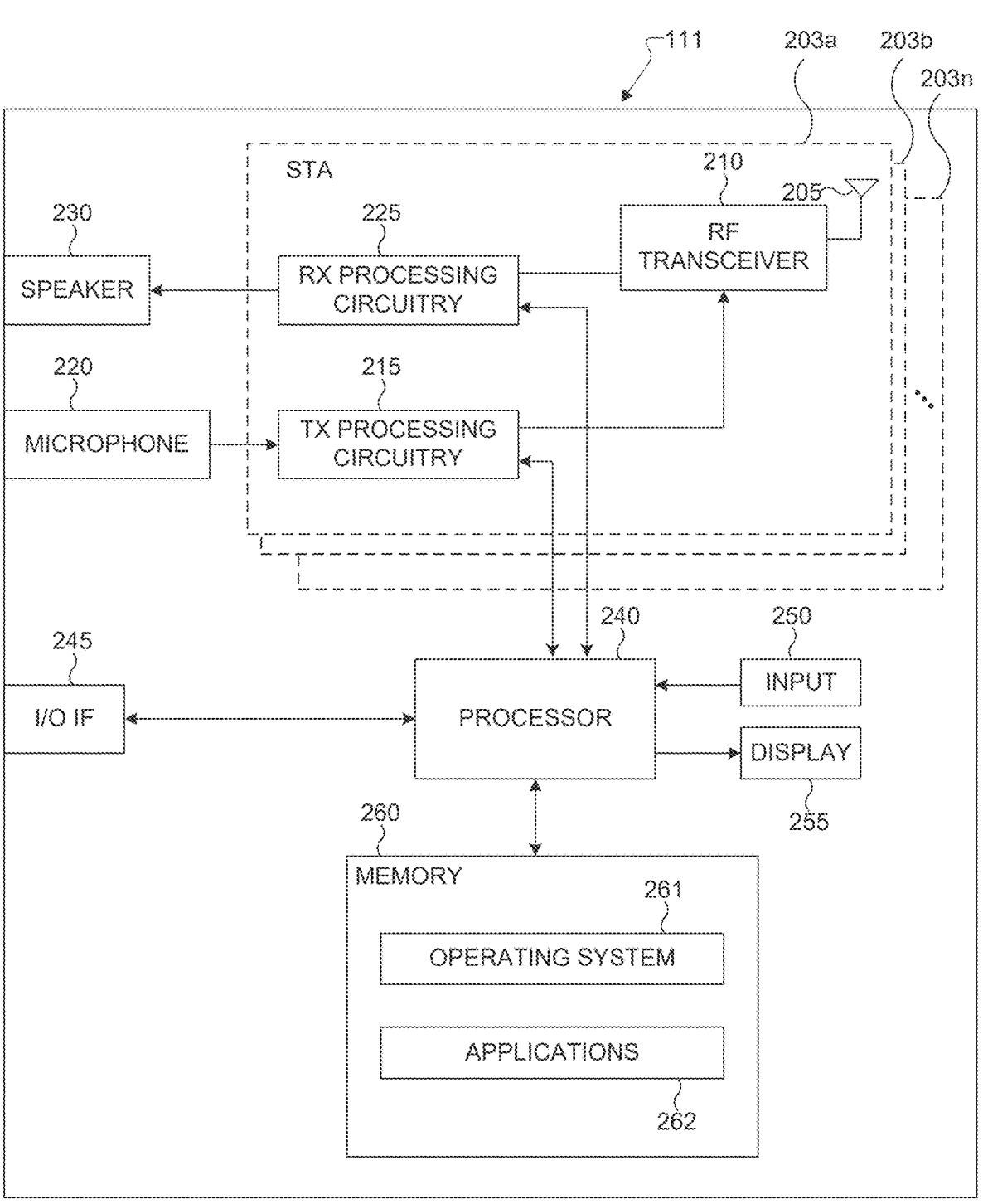
FIG. 2B illustrates an example station (STA) according to various embodiments of the present disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHZ, or 6 GHZ, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to support buffered group-addressed management frame indication. In some embodiments, the controller/processor 240 includes at least one microprocessor or microcontroller.

The controller/processor 240 is also capable of executing other processes and programs resident in the memory 260, such as operations for supporting buffered group-addressed management frame indication. The controller/processor 240 can move data into or out of the memory 260 as required by an executing process. In some embodiments, the controller/processor 240 is configured to execute a plurality of applications 262, such as applications for supporting buffered group-addressed management frame indication. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

IEEE 802.11be supports multiple bands of operation, where an access point (AP) and a non-AP device can communicate with each other, called links. Thus both the AP and non-AP device may be capable of communicating on different bands/links, which is referred to as multi-link operation (MLO). Devices capable of such MLO are referred to as multi-link devices (MLDs). For allowing the non-AP MLDs to save power, several power management modes have also been defined. Such a power management mode has two states: doze and awake, and when a non-AP MLD transitions to the doze state on one or more links, the corresponding AP of the AP MLD buffers the individually-addressed and group addressed traffic to be delivered to the non-AP MLD. To manage the transmissions on such multiple bands with the associated non-AP MLDs, the AP MLD broadcasts beacon frames periodically on each of its links/bands. Such beacons may hold important information such as channel switch announcements, quiet periods, indication of buffered traffic for the non-AP MLDs etc. To enable reliable reception of such beacons despite being in power save mode, during the multi-link association process with an AP MLD, each non-AP MLD also negotiates a listen interval with the AP MLD by including it in the association request frame. A non-AP MLD shall be in awake state and decode at least one beacon frame on any of the links associated with the AP MLD, within an interval of duration equal to the listen interval since the last beacon frame it decoded on any associated link with the AP MLD.

There is a special class of beacon frames called delivery traffic indication message (DTIM) beacons that identify beacons used for delivering buffered group-addressed frames. Each AP affiliated with an AP MLD transmits buffered group addressed frames immediately after every DTIM beacon. While the buffered group addressed management frames are transmitted independently from each AP of the AP MLD, buffered group addressed data frames that are expected to be received by a non-AP MLD are transmitted on all the links set up with the non-AP MLD. To make the non-AP MLD aware of the pending group-addressed traffic, each AP of AP MLD may indicate if another AP has buffered group addressed frames by using a bit in the partial virtual bitmap field of the traffic indication map (TIM) element that is transmitted within the DTIM beacons. Note that TIM element may only indicate the presence of buffered traffic buffered at MLD level. To further convey or recommend the link where a non-AP MLD should retrieve the buffered traffic, a multi-link traffic indication element may also be included in the beacon frames along with the TIM element that is transmitted by an AP of the AP MLD.

For improving channel access capability with limited hardware cost and power consumption or to improve spectral efficiency, IEEE 802.11be also supports an operating mode for a non-AP MLD device called enhanced multi-link single radio (EMLSR). mode. In EMLSR mode, a non-AP device behaves like a single radio device that can perform channel sensing and reception of elementary packets on multiple bands/links simultaneously, but can perform reliable data communication on only one link at a time.

Figure 3:
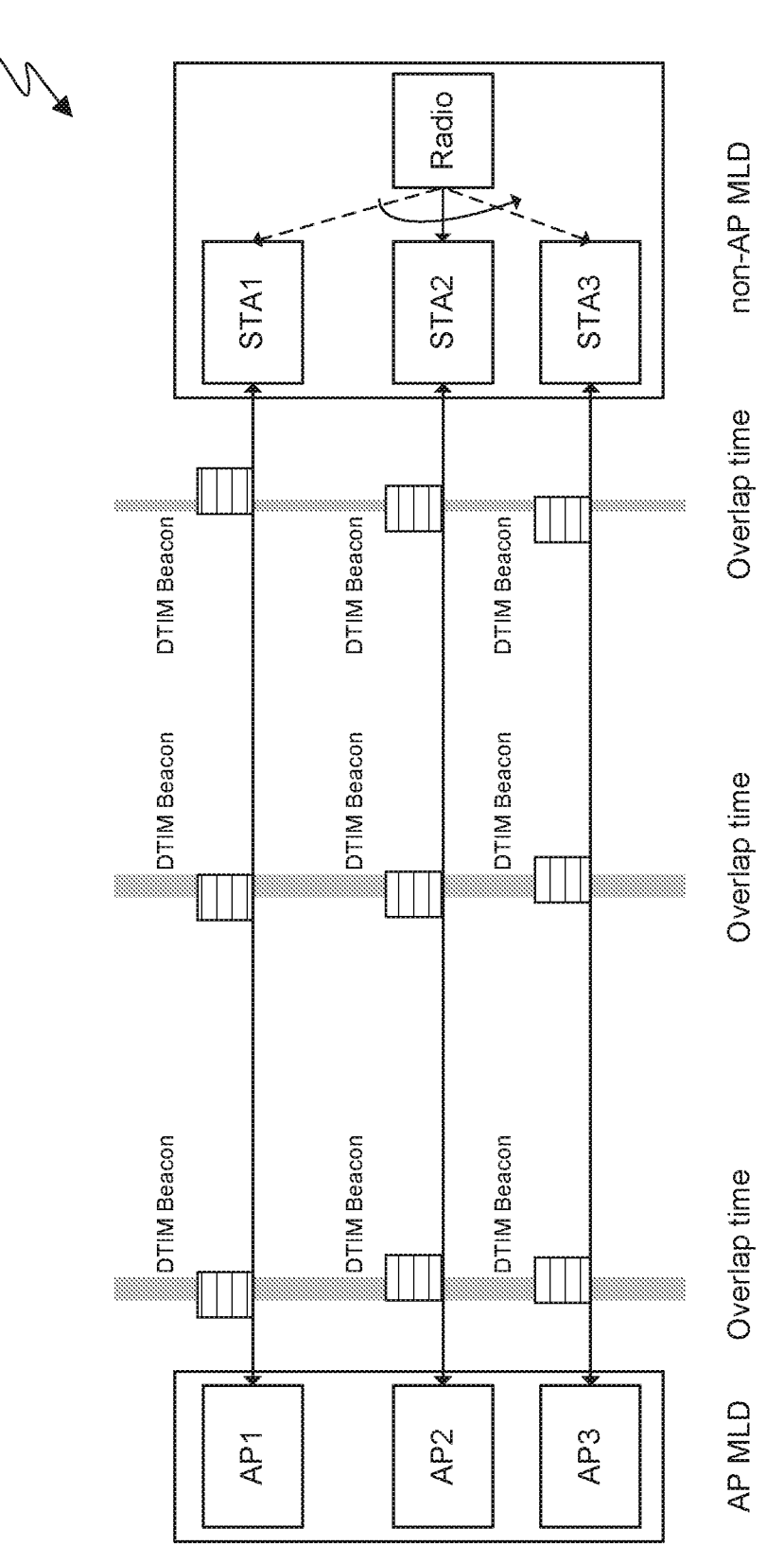
FIG. 3 illustrates time-overlapped delivery traffic indication message (DTIM) beacon transmission in multi-link operation according to embodiments of the present disclosure.

FIG. 3 illustrates time-overlapped DTIM beacon transmission in multi-link operation 300 according to embodiments of the present disclosure. The embodiment of the time-overlapped DTIM beacon transmission in multi-link operation 300 shown in FIG. 3 is for illustration only. Other embodiments of the time-overlapped DTIM beacon transmission in multi-link operation 300 could be used without departing from the scope of this disclosure.

Several classes of non-AP MLDs may be unable to receive all DTIM beacons even if they intend to. For example, an EMLSR non-AP MLD or a single radio non-AP MLD that has multiple links enabled, cannot receive DTIM beacons on two links if the transmit times of the DTIM beacons overlap as shown in FIG. 3. Receiving only one of such multiple overlapping DTIM beacons is sufficient to receive group addressed data frames since group addressed data frames are buffered on all links. However, group addressed management frames are only buffered on the link corresponding to the management frame and therefore can be missed in such a scenario if a DTIM beacon is missed. To prevent skipping such beacons, the knowledge of whether the AP MLD has buffered group-addressed management frames on each link can be helpful. Additionally, any non-AP MLD (including simultaneous transmit-receive device) may also be interested in receiving group-addressed management frames but may be interested in skipping group-addressed data frames for power save purposes etc. Again for this, the knowledge of whether the AP MLD has buffered group-addressed management frames on each link can be helpful. The buffered traffic indication in the TIM, as per current baseline text, only indicates if group-addressed traffic is buffered for a non-AP MLD on a link, without indicating if they are data frames or management frames. So sufficient information is not available for a non-AP MLD to prioritize DTIM beacons containing group-addressed management frames.

Various embodiments of the present disclosure provide an indication of buffered group addressed data frames and buffered group addressed management frames in (a) the TIM element only; and (b) in both the TIM element and the multi-link traffic indication element. Various embodiments of the present disclosure provide that with regard to using only the TIM element to carry the above-mentioned indication, a bitmap control field and a partial virtual bitmap field transmitted in the TIM element are used. Two bits per AP may be included in the partial virtual bitmap field, where one of the two bits may indicate the presence of buffered group-addressed management frames and another bit may indicate the presence of group-addressed data frames. In another embodiment, the bit for group addressed data frames may be skipped. Various embodiments of the present disclosure provide that with regard to using both the TIM element and the multi-link traffic indication element to carry the above-identified indication, the "AID offset" subfield and the "Per-link-Traffic indication list" field in the multi-link traffic indication element are used. Various embodiments of the present disclosure provide that to determine whether a cross-link group addressed frame indication will be provided by an AP MLD, an indication in the 'MLD capabilities and operations' subfield of the common info field of the basic multi-link element transmitted by an AP MLD is used.

Figure 4:
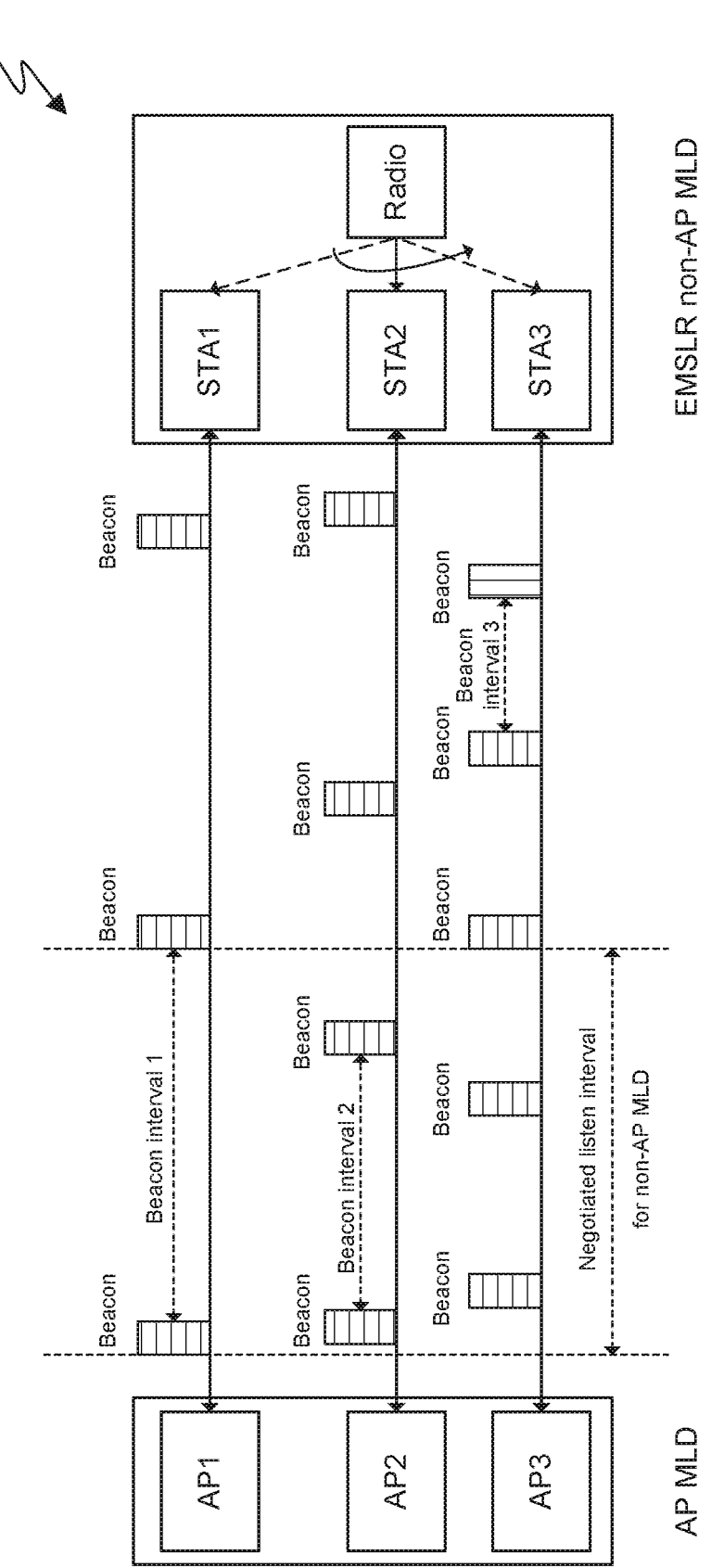
FIG. 4 illustrates a non-AP enhanced multi-link single radio (EMLSR) MLD being associated with an AP MLD on L=3 links and the corresponding beacon transmissions on the L links according to embodiments of the present disclosure.

FIG. 4 illustrates an example of a non-AP EMLSR MLD being associated with an AP MLD on L=3 links and the corresponding beacon transmissions on the L links 400 according to embodiments of the disclosure. The embodiment of the non-AP EMLSR MLD being associated with an AP MLD on L=3 links and the corresponding beacon transmissions on the L links 400 shown in FIG. 4 is for illustration only. Other embodiments of the non-AP EMLSR MLD being associated with an AP MLD on L=3 links and the corresponding beacon transmissions on the L links 400 could be used without departing from the scope of this disclosure.

Figure 5:
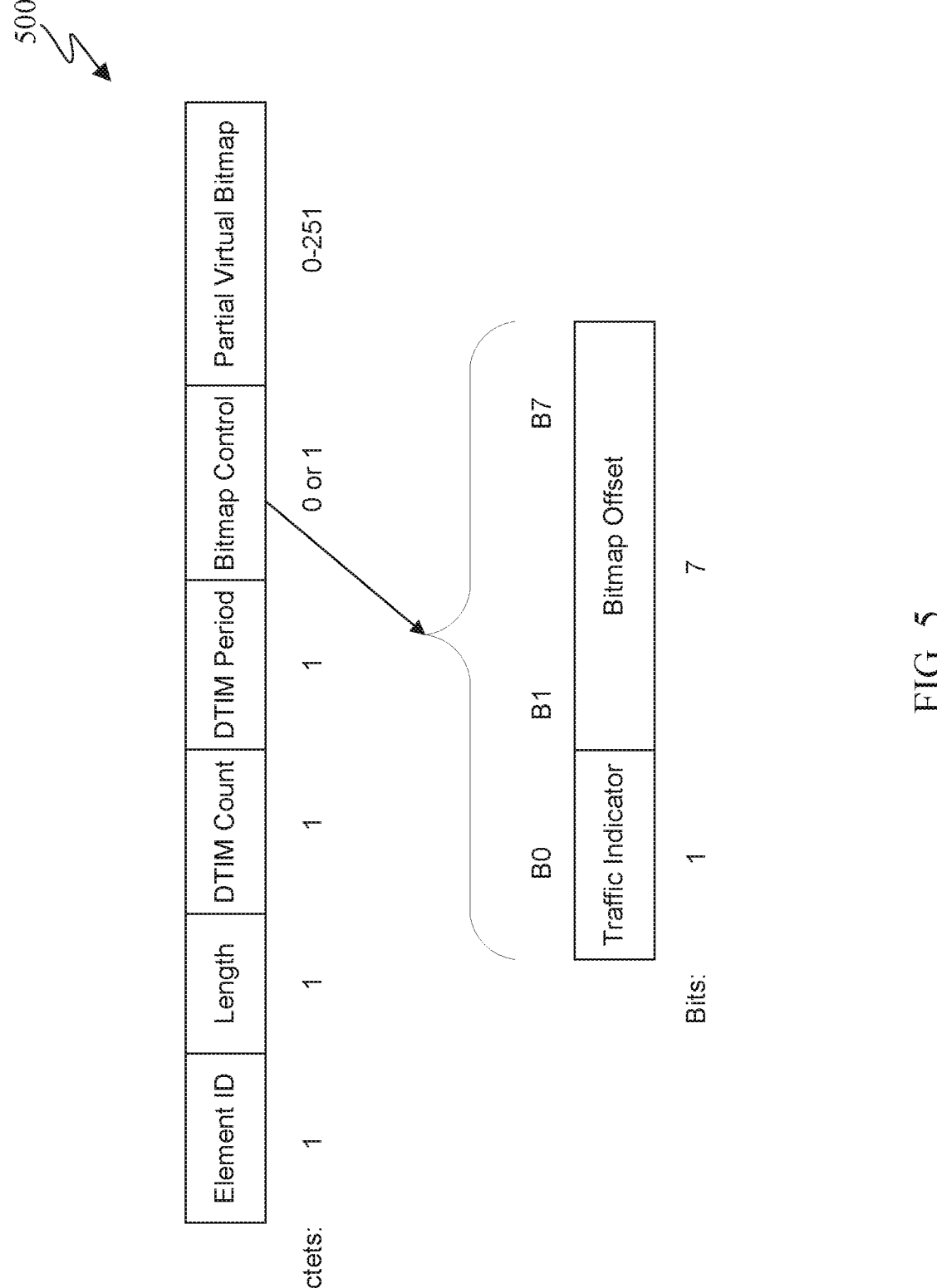
FIG. 5 illustrates an example structure of a traffic identification map (TIM) element according to embodiments of the present disclosure.

FIG. 5 illustrates an example structure of the TIM element 500 according to embodiments of the disclosure. The embodiment of the structure of the TIM element 500 shown in FIG. 5 is for illustration only. Other embodiments of the structure of the TIM element 500 could be used without departing from the scope of this disclosure.

Figure 6:
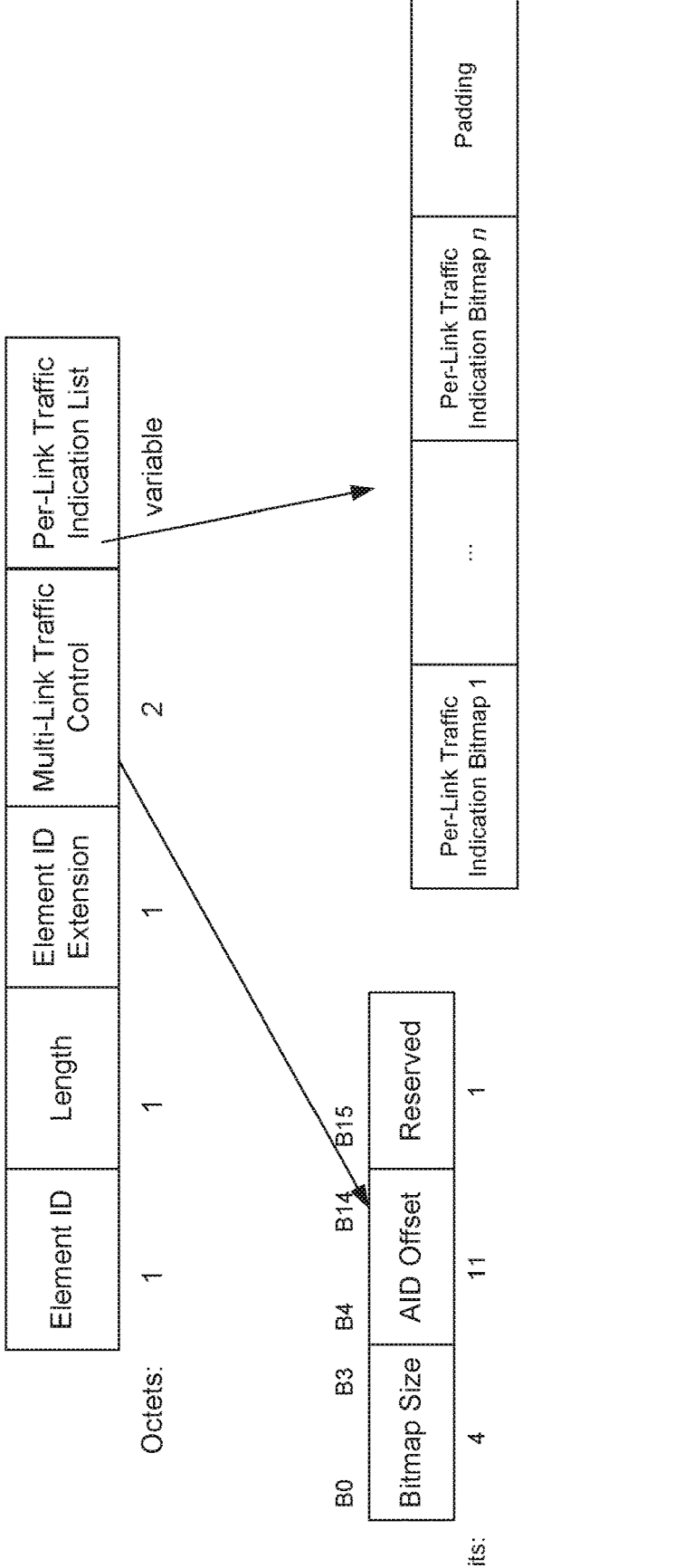
FIG. 6 illustrates an example structure of a multi-link traffic indication element according to embodiments of the present disclosure.

FIG. 6 illustrates an example structure of the multi-link traffic indication element 600 according to embodiments of the disclosure. The embodiment of the structure of the multi-link traffic indication element 600 shown in FIG. 6 is for illustration only. Other embodiments of the structure of the multi-link traffic indication element 600 could be used without departing from the scope of this disclosure.

Various embodiments of the present disclosure consider a scenario where a non-AP MLD has a multi-link association with an AP MLD on L links, as shown in FIG. 4. The AP MLD may transmit beacon frames periodically on all the L links, and the target beacon transmit times (TBTT) and beacon intervals can be the same or different on the L links, as shown in FIG. 4. Each of the L links may also have different DTIM beacon periods. During the multi-link association, the non-AP MLD may also have negotiated a listen interval by filling the listen interval field in the association request frame. The DTIM beacon interval can also be different on the L links. Each beacon frame may also include a TIM element whose structure is as depicted as illustrated in FIG. 5. Each AP of the AP MLD may also optionally include a multi-link traffic indication element in its beacon frames whose structure is depicted as illustrated in FIG. 6. As described above, each AP of the AP MLD may carry an indication of buffered group addressed data frames and buffered group addressed management frames of one or more of the APs of the AP MLD in the TIM element only or in both the TIM element and the multi-link traffic indication element.

In one embodiment, this buffered group-addressed frame indication may only be included in TIM elements in DTIM beacons (where such TIM element has DTIM count=0 to indicate that beacon is a DTIM beacon) or also in multi-link traffic indication elements transmitted in DTIM beacons. In another embodiment, this indication may be included in TIM elements or multi-link traffic indication elements transmitted in all beacons. The indication carried by an AP of the AP MLD in a beacon may be based on the latest information available at that AP about the buffered group-addressed frames at other links. In one case, if an AP of an AP MLD is unaware if the buffered group-addressed frames at another AP of the AP MLD are data frames or management frames, it may indicate them to be data frames. In another case, if an AP of an AP MLD is unaware if the buffered group-addressed frames at another AP of the AP MLD are data frames or management frames, it may indicate them to be management frames. Each AP of the AP MLD may schedule for transmission buffered group-addressed frames immediately after every DTIM beacon except that a target wake time (TWT) scheduling AP may schedule for transmission the buffered group addressed frames during the broadcast TWT service periods lying in the beacon interval of the DTIM beacon.

For one or more classes of group-addressed management frames, the frames that are expected to be received by a non-AP MLD may be buffered for transmission on all the links set up with the non-AP MLD. This may enable the non-AP MLD to receive the frame by being in receive mode during the DTIM beacon on any of the setup links, as is the case with group-addressed data frames. For each link, the indication may be included in all (or a subset of) the beacons.

Figure 7:
FIG. 7 illustrates an example bitmap control field and partial virtual bitmap transmitted in the TIM element of AP1 after the DTIM beacon according to embodiments of the present disclosure.

FIG. 7 illustrates an example bitmap control field and partial virtual bitmap transmitted in the TIM element of AP1 after the DTIM beacon 700 according to embodiments of the present disclosure. The embodiment of the bitmap control field and partial virtual bitmap transmitted in the TIM element of AP1 after the DTIM beacon 700 shown in FIG. 7 is for illustration only. Other embodiments of the bitmap control field and partial virtual bitmap transmitted in the TIM element of AP1 after the DTIM beacon 700 could be used without departing from the scope of this disclosure.

In one embodiment, the TIM element transmitted by each AP of an AP MLD in all (or a subset of) beacons may include two bits (per AP) to indicate whether one or more APs of the AP MLD has buffered group addressed frames. In one example, these two bits per AP may be included in the partial virtual bitmap field of the TIM element. The two bits per AP can be the bits after the last bit corresponding to a non-transmitted BSSID which is in the same multiple BSSID as the AP. One of the two bits may indicate the presence of buffered group-addressed management frames and another bit may indicate the presence of group-addressed data frames. In this case, the first [(number of BSSIDs)+2* (number of links)] bits of the partial virtual bitmap may indicate the presence of buffered group-addressed traffic at all APs of the AP MLD, and the lowest possible association identifier (AID) that can be assigned to any non-AP MLD can be the following sum: (number of BSSIDs)+2*(number of links). As an example, consider the scenario where the AP MLD has two APs (AP1 and AP2) operating on different links (L=2) and each AP has one transmitted BSSID and 7 non-transmitted BSSIDs. Let us assume AP 1 has buffered group-addressed data frames and AP2 has buffered group-addressed management frames. In addition, let the AP MLD have buffered individually addressed frames for AID 13 and AID 15. Then the bitmap control field and partial virtual bitmap transmitted in the TIM element by AP1 during its DTIM beacons can have a structure as shown in FIG. 7. In this example, when the TIM is transmitted by AP1, by setting bit B16 to '0' and bit B17 to '1', AP1 indicates that it has buffered group-addressed data frames but not management frames. When transmitted by AP1, by setting the bits B18 '1' and bit B19 is '0', AP1 indicates that AP2 has buffered group-addressed management frames but not group-addressed data frames. By receiving such a TIM element, the non-AP MLD may determine which APs of the AP MLD have buffered group-addressed management frames and group-addressed data frames, and accordingly may determine the appropriate DTIM beacon to receive in case reception of DTIM beacons on all links with buffered group-addressed traffic is infeasible. As an example, the non-AP MLD may prioritize reception of the DTIM beacon on the link which has buffered group-addressed management frames. In another example of this embodiment, since each associated non-AP MLD may not know the number of links that the AP operates with, the indication of group-addressed frames in the TIM may always be for L=16 links and thus may have 32 bits reserved for this group-addressed traffic indication.

In yet another example of this embodiment, a two-bit indication after the non-transmitted BSSID bits may be used for other APs of the same AP MLD while only one bit may be used for the AP that is transmitting the TIM element. This is sufficient because the bit B0 of the bitmap control field already provides indication of buffered group-addressed frame for the transmitting AP. In this example, if B0 is set to 1 and the additional bit for this AP is set to 1 then it may indicate presence of buffered group-addressed management frame (in addition to any data frames) at the AP transmitting the TIM element. On the other hand, if B0 is set to 1 and this additional bit is set to 0 then it may indicate presence of buffered group-addressed data frame at the AP transmitting the TIM element. In one example, the sequence of the 2 indication bits for the different links is in the ascending order of their link IDs. In another example, the indication for the link transmitting the TIM element is included first, followed by the 2 indication bits for the other links sorted in the ascending order of their respective link IDs.

Figure 8:
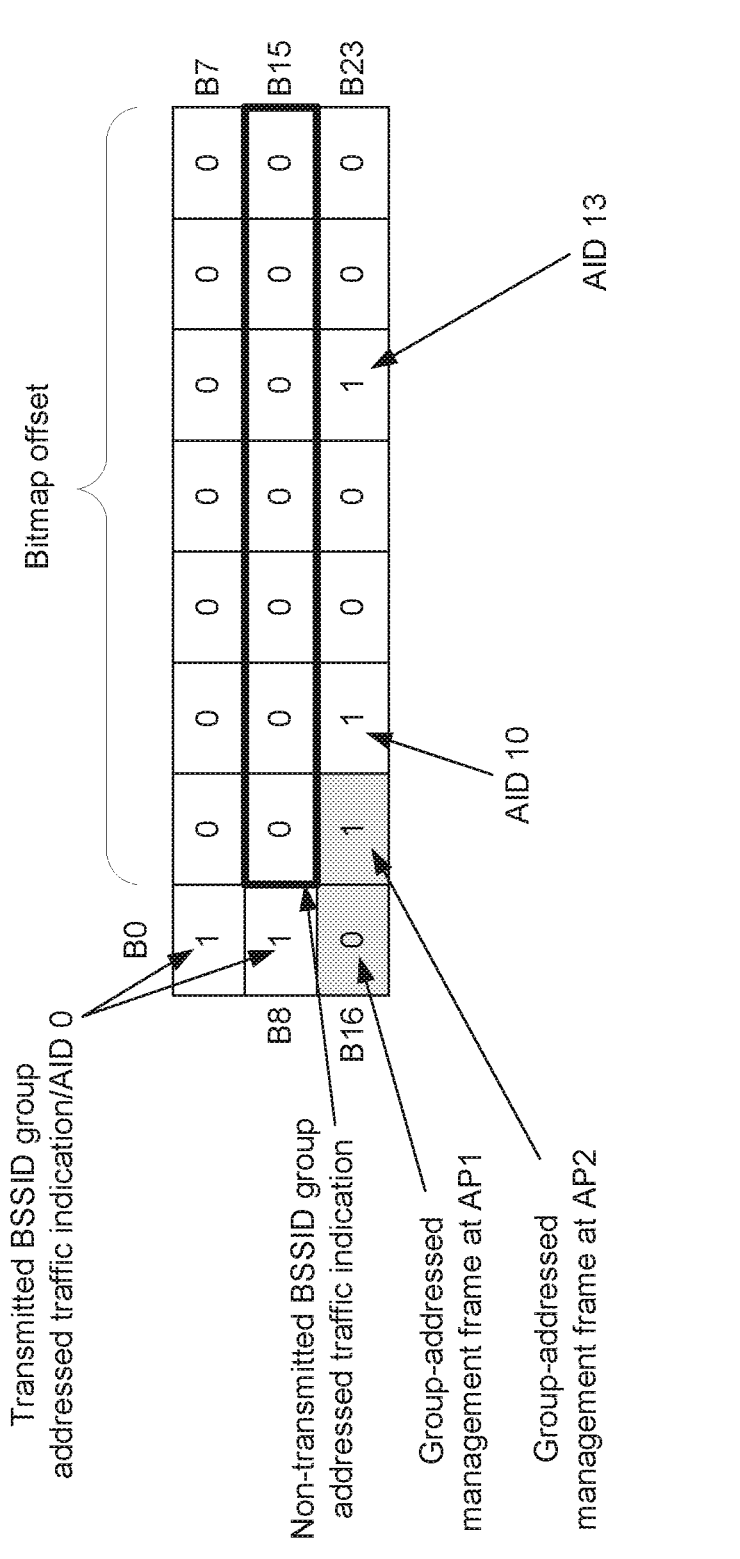
FIG. 8 illustrates another example bitmap control field and partial virtual bitmap transmitted in the TIM element of AP1 after the DTIM beacon according to embodiments of the present disclosure.

FIG. 8 illustrates another example bitmap control field and partial virtual bitmap transmitted in the TIM element of AP1 after the DTIM beacon 800 according to embodiments of the present disclosure. The embodiment of the bitmap control field and partial virtual bitmap transmitted in the TIM element of AP1 after the DTIM beacon 800 shown in FIG. 8 is for illustration only. Other embodiments of the bitmap control field and partial virtual bitmap transmitted in the TIM element of AP1 after the DTIM beacon 800 could be used without departing from the scope of this disclosure.

In one embodiment, the TIM element transmitted by each AP of an AP MLD in all (or a subset of) the beacons may include one bit to indicate whether each AP of the AP MLD has buffered group addressed management frames (in addition to group-addressed data frames if any). This bit per AP may be included in the partial virtual bitmap field of the TIM element after the last bit corresponding to a non-transmitted BSSID which is in the same multiple BSSID as the AP. In this embodiment, in the TIM element transmitted by AP1, the bit corresponding to another AP2 of the same AP MLD is set to 1 only if there are pending group-addressed management frames at the AP2. Since group-addressed data frames are buffered on all links, the presence of buffered group-addressed data frames at the AP MLD can be inferred using the traffic indication bits corresponding to the AP transmitting the TIM, i.e., group addressed bits of AP1, and bits corresponding to group-cast AIDs. As an example, consider the scenario where the AP MLD has two APs operating on different links (L=2) and each AP has one transmitted BSSID and 7 non-transmitted BSSIDs. Let us assume AP 1 has buffered group-addressed data frames and AP2 has buffered group-addressed management frames. Additionally, let the AP MLD have buffered individually addressed frames for AID 10 and AID 13. Then the bitmap control field and partial virtual bitmap transmitted in the TIM element by AP1 during its DTIM beacons can have a structure as shown in FIG. 8. In this example, when the TIM is transmitted by AP1, by setting the bits B0 and B8 to '1' and bit B16 to '0', AP1 indicates that it has buffered group-addressed data frames. When transmitted by AP1, by setting bit B17 to '1', AP1 indicates that AP2 has buffered group-addressed management frames (in addition to group-addressed data frames if any). In one example, the sequence of the indication bits for the different links is in the ascending order of their link IDs. In another example, the indication for the link transmitting the TIM element is included first, followed by the indication bits for the other links sorted in the ascending order of their respective link IDs.

Figure 9:
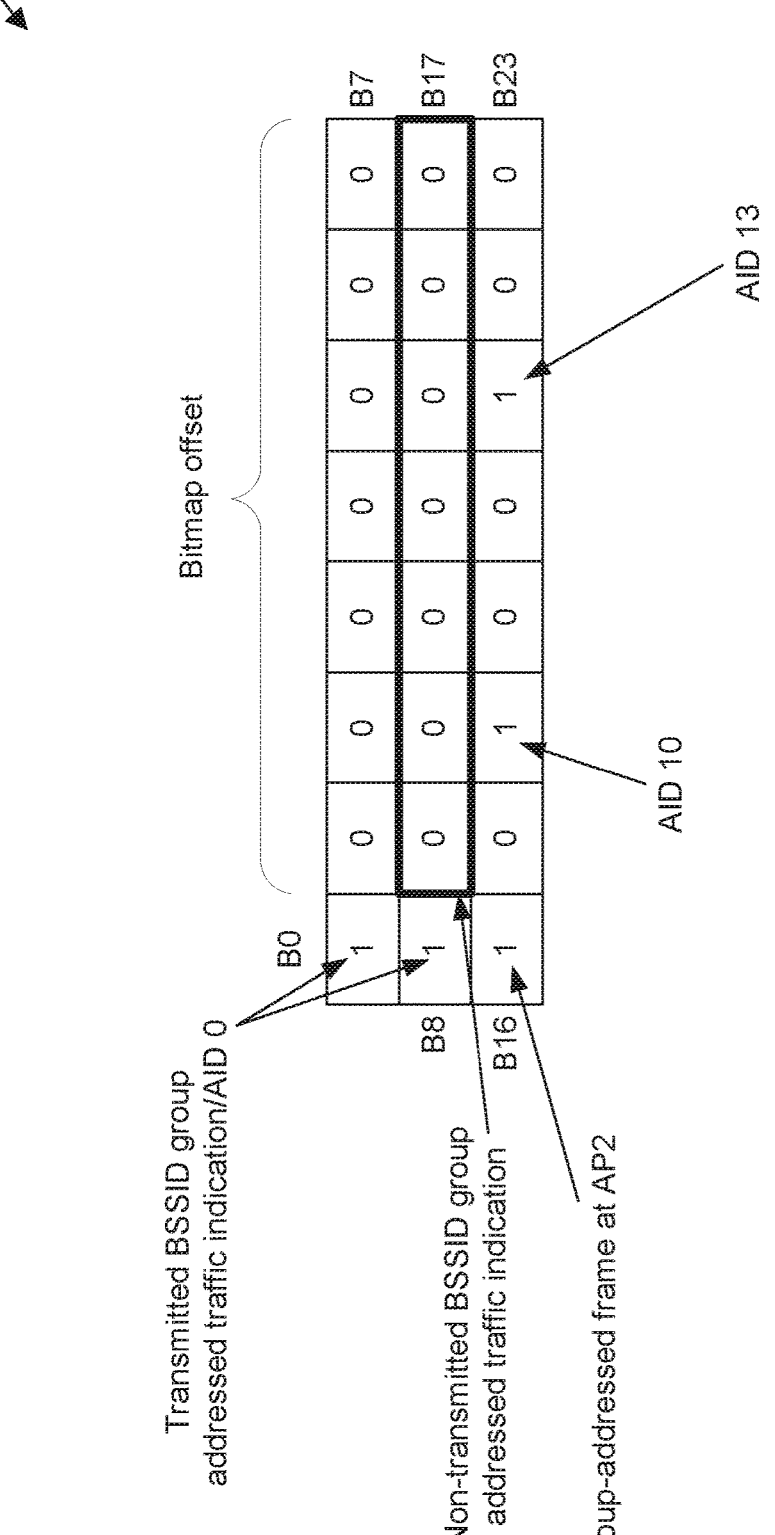
FIG. 9 illustrates yet another example bitmap control field and partial virtual bitmap transmitted in the TIM element of AP1 after the DTIM beacon according to embodiments of the present disclosure.

FIG. 9 illustrates yet another bitmap control field and partial virtual bitmap transmitted in the TIM element of AP1 after the DTIM beacon 900 according to embodiments of the present disclosure. The embodiment of the bitmap control field and partial virtual bitmap transmitted in the TIM element of AP1 after the DTIM beacon 900 shown in FIG. 9 is for illustration only. Other embodiments of the bitmap control field and partial virtual bitmap transmitted in the TIM element of AP1 after the DTIM beacon 900 could be used without departing from the scope of this disclosure.

In one embodiment, the TIM element transmitted by each AP of an AP MLD in all (or a subset of) the beacons may include one bit to indicate if each of the other APs has buffered group addressed frames. This bit may be included in the partial virtual bitmap field of the TIM element after the last bit corresponding to a non-transmitted BSSID which is in the same multiple BSSID as the AP. In this embodiment, in the TIM element transmitted by AP1, the bit corresponding to another AP2 of the same AP MLD may be set to 1 if there are pending group-addressed frames at the AP2 (including both data and management group-addressed frames). In this case, the first (number of BSSIDs)+(number of links)−1 bit of the partial virtual bitmap may indicate the presence of buffered group-addressed traffic at all APs of the AP MLD, and the lowest possible association identifier (AID) that can be assigned to any non-AP MLD can be the sum of: (number of BSSIDs)+(number of links). As an example, consider the scenario where the AP MLD has two APs operating on different links (L=2) and each AP has one transmitted BSSID and 7 non-transmitted BSSIDs. Let us assume AP 1 has buffered group-addressed data frames and AP2 has buffered group-addressed management frames. Similarly let the AP MLD have buffered individually addressed frames for AID 13 and AID 15. Then the bitmap control field and partial virtual bitmap transmitted in the TIM element by AP1 during its DTIM beacon can have a structure as shown in FIG. 9. In this example, when the TIM is transmitted by AP1, by setting the bits B0 and B8 to '1', AP1 indicates that it has buffered group-addressed frames. When transmitted by AP1, by setting bit B16 to '1', AP1 indicates that AP2 has buffered group-addressed frames.

In this embodiment, the indication of group-addressed management frames and the suggested link to use for individually-addressed frames can be indicated by the AP MLD in the multi-link traffic indication element that is transmitted in conjunction with the TIM element. The structure of the multi-link traffic indication element is illustrated in FIG. 6. An AP of an AP MLD may not include a multi-link traffic indication element in a beacon if there are no group-addressed frames buffered at any of the APs affiliated with the same AP MLD and if there are no buffered individually addressed frames for any non-AP MLD with non-default TID-to-link mapping.

While the TIM element may indicate the traffic buffered for each AID (or MLD) and any buffered group-addressed frames at any AP of the AP MLD, the multi-link traffic indication element may indicate on which link the MLD should try to receive that traffic. The multi-link traffic indication element contains a multi-link traffic control field whose 'AID offset' subfield indicates a certain bit number k of the traffic indication virtual bitmap. The multi-link traffic indication element may also contain a Per-link-Traffic indication list, which is a list of 'per-link traffic indication bitmap' subfields that corresponds to the AIDs of the associated non-AP MLDs, starting from AID k, that have their corresponding bit in the 'partial virtual bitmap' subfield of the TIM element set to 1.

Figure 10:
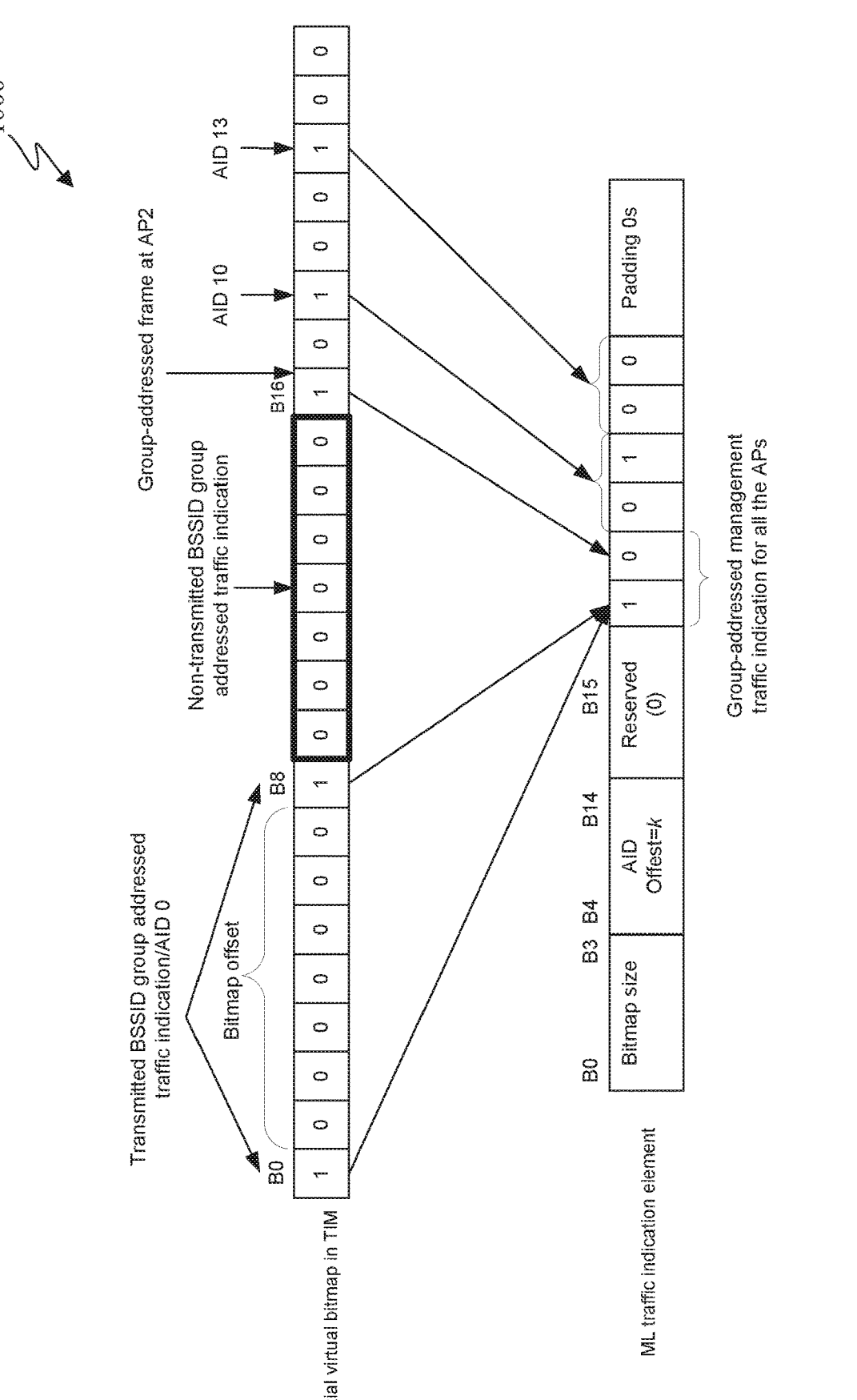
FIG. 10 illustrates an example multi-link traffic indication element according to embodiments of the present disclosure.

FIG. 10 illustrates an example multi-link traffic indication element 1000 according to embodiments of the present disclosure. The embodiment of the multi-link traffic indication element 1000 shown in FIG. 10 is for illustration only. Other embodiments of the multi-link traffic indication element 1000 could be used without departing from the scope of this disclosure.

In one embodiment, if at least one group-addressed frame is buffered at any of the APs affiliated with the same AP MLD, the value of k in AID offset can be set to be lower than the bit number corresponding to the group-addressed frames for the APs of the AP MLD in the TIM element. In this case, the first subfield of the 'Per-link-Traffic indication list' may correspond to group-addressed frames at different APs of the same AP MLD, and can be referred to as 'group-addressed management traffic indication' subfield. The size of this subfield can be equal to the number of links at the AP MLD, as indicated in the 'Bitmap size' subfield of the 'multi-link traffic control' field of the multi-link traffic indication element. The l-th bit in this 'group-addressed management traffic indication' subfield is set to 1 if there are buffered group-addressed management frames (in addition to any group-addressed data frames) at the l-th AP of the AP MLD (sorted in ascending order of link ID). Otherwise, the bit corresponding bit l is set to 0. Using the TIM element and the 'group-addressed management traffic indication' subfield of the 'per-link traffic indication list' field of multi-link element, a non-AP MLD may determine whether there are group-addressed frames buffered at the AP MLD on each link and if the buffered frames are data frames or management frames. As an example, consider the scenario where the AP MLD has two APs operating on different links (L=2) and each AP has one transmitted BSSID and 7 non-transmitted BSSIDs. Let us assume AP 1 has buffered group-addressed data frames and AP2 has buffered group-addressed management frames. Additionally, let the AP MLD have buffered individually addressed frames for AID 10 and AID 13. Then the construction of the multi-link traffic indication element from the partial virtual bitmap of the TIM element is shown in FIG. 10. In this example, when the multi-link traffic indication element is transmitted by AP1, by setting bit B16 of multi-link traffic indication element to '0', AP1 indicates that it does not have buffered group-addressed management frames. When transmitted by AP1, by setting bit B17 of multi-link traffic indication element to '1', AP1 indicates that AP2 has buffered group-addressed management frames (in addition to any group-addressed data frames).

In one example, the sequence of the indication bits for the different links in the TIM element and multi-link traffic indication element is in the ascending order of their link IDs. In another example, the indication for the link transmitting the multi-link traffic indication element is included first, followed by the indication bits for the other links sorted in the ascending order of their respective link IDs. In another example, the first subfield of the 'Per-link-Traffic indication list' may always be reserved for group-addressed frames at different APs of the same AP MLD, referred to as 'group-addressed management traffic indication' subfield. In this example the 'AID offset' subfield of the 'Multi-link control' field determines the AIDs in the TIM element to be considered to build the 'Per-link-Traffic indication list' from the second subfield onwards (since first subfield is reserved for group-addressed traffic). In one example, the first subfield of the 'Per-link-Traffic indication list' may indicate the link suggested by the AP MLD for receiving the group-addressed frames.

Figure 11:
FIG. 11 illustrates a flow chart of a method for AP MLD operation for group addressed frame indication according to embodiments of the present disclosure.
Figure 11:
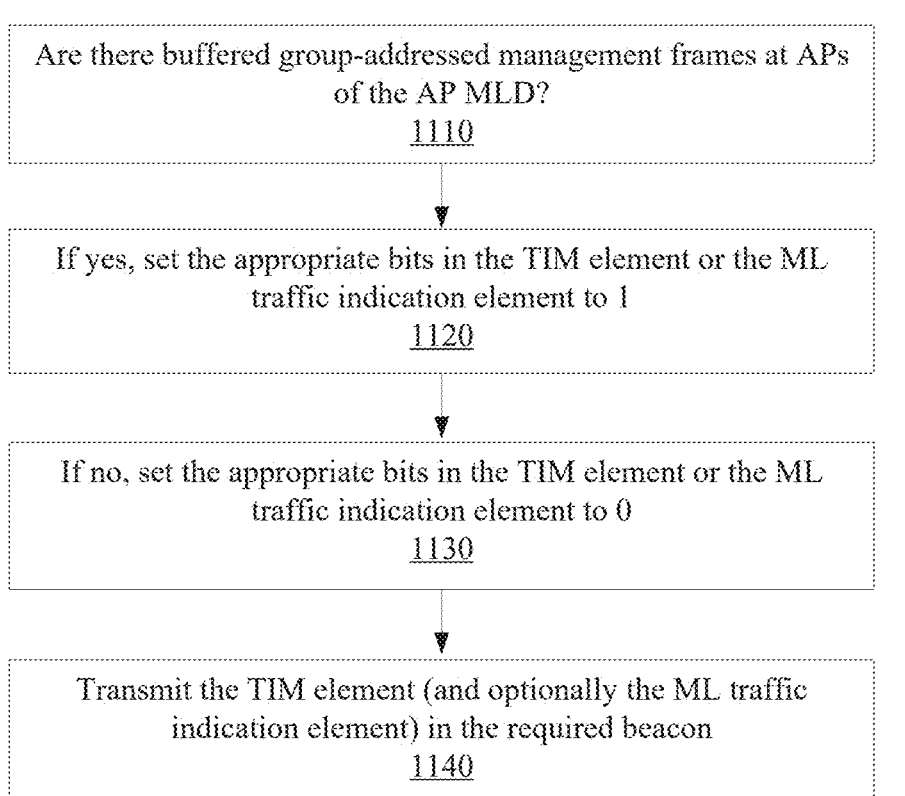

FIG. 11 illustrates a flow chart illustrating a method 1100 for AP MLD operation for group addressed frame indication according to embodiments of the present disclosure. The embodiment of the method 1100 for AP MLD operation for group addressed frame indication shown in FIG. 11 is for illustration only. Other embodiments of the method 1100 for AP MLD operation for group addressed frame indication could be used without departing from the scope of this disclosure.

As illustrated in FIG. 11, the method 1100 begins with the AP MLD determining whether there are buffered group-addressed management frames at APs of the AP MLD (step 1110). If there are buffered group-addressed management frames at APs of the AP MLD, then at step 1120, the AP MLD sets the appropriate bits in the TIM element or the multi-link traffic indication element to 1. If there are not buffered group-addressed management frames at APs of the AP MLD, then at step 1130, the AP MLD sets the appropriate bits in the TIM element or the multi-link traffic indication element to 0. At step 1140, the AP MLD then transmits the TIM element (and optionally the multi-link traffic indication element) in the required beacon.

Figure 12:
FIG. 12 illustrates a flow chart of a method for non-AP MLD operation for group addressed frame indication according to embodiments of the present disclosure.
Figure 12:
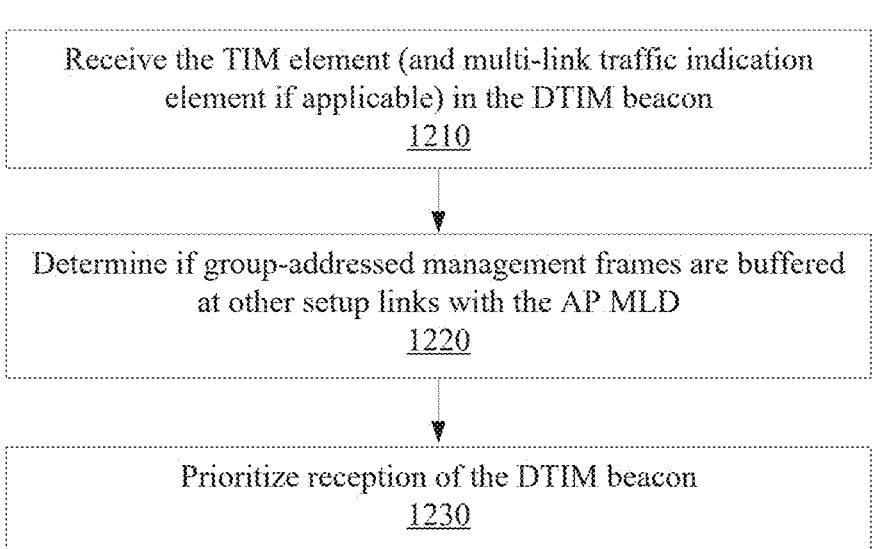

FIG. 12 illustrates a flow chart illustrating a method 1200 for non-AP MLD operation for group addressed frame indication according to embodiments of the present disclosure. The embodiment of the method 1200 for non-AP MLD operation for group addressed frame indication shown in FIG. 12 is for illustration only. Other embodiments of the method 1200 for non-AP MLD operation for group addressed frame indication could be used without departing from the scope of this disclosure.

As illustrated in FIG. 12, the method 1200 begins with the non-AP MLD receiving the TIM element (and optionally the multi-link traffic indication element) in the DTIM (step 1210). For example, the non-AP MLD receives the DTIM beacon which includes the TIM element from an AP of the AP MLD. At step 1220, the non-AP MLD determines whether group-addressed management frames are buffered at other setup links with the AP MLD. For example, the non-AP MLD may determine whether group-addressed management frames are buffered at other setup links with the AP MLD based on the TIM element. At step 1230, the non-AP MLD prioritizes reception of the DTIM beacons. For example, prioritization may be based on the determination of whether group-addressed management frames are buffered at other setup links with the AP MLD.

In any one or more of the embodiments above, the TIM element includes two bits to indicate a presence of buffered group addressed frames at the one or more other APs of the AP MLD, and a first of the two bits indicating a presence of the buffered group-addressed management frames at the one or more other APs of the AP MLD and a second of the two bits indicating a presence of buffered group-addressed data frames at the one or more other APs of the AP MLD.

In any one or more of the embodiments above, the TIM element includes one bit to indicate a presence of the buffered group-addressed management frames at the one or more other APs of the AP MLD.

In any one or more of the embodiments above, the DTIM beacon further comprises a multi-link traffic indication element associated with the group-addressed management frames, and the multi-link traffic indication element indicating a link on which the STA should attempt to receive the group-addressed management frames.

In any one or more of the embodiments above, the TIM element includes one bit to indicate a presence of buffered group addressed frames at the one or more other APs of the AP MLD, and the multi-link traffic indication element incudes a group-addressed management traffic indication field indicating a presence of buffered group-addressed management frames at the one or more other APs of the AP MLD.

In any one or more of the embodiments above, the DTIM beacon further comprises a multi-link traffic indication element associated with the group-addressed management frames, and the multi-link traffic indication element indicating whether a cross-link group addressed frame indication will be provided by the AP MLD.

In any one or more of the embodiments above, a bit indicating whether a cross-link group addressed frame indication will be provided by the AP MLD is included in a beacon frame or in a probe response frame received from the AP MLD.

Figure 13:
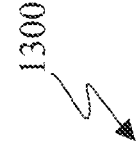
FIG. 13 illustrates an example structure of a basic multi-link element according to embodiments of the present disclosure.

FIG. 13 illustrates an example structure of a basic multi-link element 1300 according to embodiments of the present disclosure. The embodiment of the basic multi-link element 1300 shown in FIG. 13 is for illustration only. Other embodiments of the basic multi-link element 1300 could be used without departing from the scope of this disclosure.

In one embodiment, an AP may not indicate if other AP(s) affiliated with the same AP MLD has buffered group addressed frames by using a bit in the Traffic Indication Virtual Bitmap. Correspondingly, in this embodiment, the AP MLD may not reserve any AID bits in the Traffic Indication Virtual Bitmap for cross-link buffered group addressed frame indication.

In another embodiment, an AP MLD can provide an indication of whether or not it will indicate if other AP(s) affiliated with the same AP MLD has buffered group addressed frames by using bits in the Traffic Indication Virtual Bitmap. The indication can be carried in the 'MLD Capabilities and Operations' subfield of the Common Info field of the Basic Multi-Link element transmitted by an AP MLD as shown in FIG. 13. The indication can be carried in a "ML Group Addressed BU Indication" bit which is set to 1 if another AP of the AP MLD provides an indication, in the partial virtual bitmap field of the TIM element it transmits in DTIM beacons, if another of the AP(s) of the same AP MLD have buffered group addressed frames. Otherwise, the "ML Group Addressed BU Indication" bit in the 'MLD Capabilities and Operations' subfield can be set to zero. If the "ML Group Addressed BU Indication" bit is set to 1, then the AP MLD may reserve some AID bits in the Traffic Indication Virtual Bitmap for the cross-link buffered group addressed frame indication. If the "ML Group Addressed BU Indication" bit is set to 0, the AP MLD may not provide cross-link buffered group addressed frame indication. In one variant of this embodiment, the AP MLD associated with a non-transmitted BSSID may inherit the same "ML Group Addressed BU Indication" as the AP MLD corresponding to the transmitted BSSID.

In one embodiment, a non-AP MLD may indicate if it interprets and uses the cross-link buffered group addressed frame indication information from the TIM element carried in DTIM beacons. This indication can be carried in the 'MLD Capabilities and Operations' subfield of the Common Info field of the Basic Multi-Link element transmitted by the non-AP MLD. The indication can be in the "ML Group Addressed BU Indication" bit, as shown in FIG. 13, which is set to 1 if each STA of the non-AP MLD interprets and uses the group-addressed AID bits in the partial virtual bitmap subfield of the TIM element. In one variant of this embodiment, if none of the associated non-AP MLDs have the "ML Group Addressed BU Indication" bit set to 1, the AP MLD may repurpose the AID bits reserved, in the Traffic Indication Virtual Bitmap for group-addressed frame indication, for some other indication.

In another embodiment, an AP MLD may dynamically change whether or not it provides an indication if another of the AP(s) affiliated with the same AP MLD has buffered group addressed frames in the partial virtual bitmap field of the TIM element transmitted in DTIM beacons. This dynamic change can be indicated by a "ML Group addressed BU Indication" bit carried in the TIM element or in another element of the beacon frame. In this embodiment the AP MLD may reserve some AID bits for the cross-link buffered group addressed frame indication in the Traffic Indication Virtual Bitmap. However, an AID bit corresponding to group-addressed frame indication for another AP affiliated with the same AP MLD shall be set to 1 in the partial virtual bitmap of the TIM element if:

The TIM element is carried in a DTIM beacon.

The indicated other AP has buffered group-addressed traffic, as per the information available upon encoding the TIM element.

The "ML Group addressed BU Indication" bit carried in the beacon frame is set to 1.

Otherwise, the AID bit may be set to 0. Note that in some TIM encoding methods such as Method B, such an AID bit when set to 0 may be skipped from inclusion in the TIM element.

The above flowcharts illustrate example methods that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD) comprising:
    a station (STA) comprising a transceiver configured to receive, from an AP of an AP MLD, a delivery traffic indication message (DTIM) beacon, the DTIM beacon comprising a traffic indication map (TIM) element; and
    a processor operably coupled to the transceiver, the processor configured to:
        determine, based on the TIM element, whether group-addressed management frames are buffered at one or more other APs of the AP MLD; and
        prioritize reception of one or more other DTIM beacons associated with the one or more other APs of the AP MLD based on whether the group-addressed management frames are buffered at the one or more other APs of the AP MLD,
    wherein the TIM element includes a single bit for each AP of the AP MLD to indicate a presence of both buffered group-addressed data frames and the buffered group-addressed management frames at the AP and the one or more other APs of the AP MLD.

2. The non-AP MLD of claim 1, wherein:
    the DTIM beacon further comprises a multi-link traffic indication element associated with the group-addressed management frames, and
    the multi-link traffic indication element indicating a link on which the STA should attempt to receive the group-addressed management frames.

3. The non-AP MLD of claim 2, wherein the multi-link traffic indication element incudes a group-addressed management traffic indication field indicating a presence of buffered group-addressed management frames at the one or more other APs of the AP MLD.

4. The non-AP MLD of claim 1, wherein:

the DTIM beacon further comprises a multi-link traffic indication element associated with the group-addressed management frames, and the multi-link traffic indication element indicating whether a cross-link group addressed frame indication will be provided by the AP MLD.

5. The non-AP MLD of claim 1, wherein a bit indicating whether a cross-link group addressed frame indication will be provided by the AP MLD is included in a beacon frame or in a probe response frame received from the AP MLD.

6. A method of wireless communication performed by a non-access point (AP) multi-link device (MLD), the method comprising:

receiving, from an AP of an AP MLD, a delivery traffic indication message (DTIM) beacon, the DTIM beacon comprising a traffic indication map (TIM) element;

determining, based on the TIM element, whether group-addressed management frames are buffered at one or more other APs of the AP MLD; and prioritizing reception of one or more other DTIM beacons associated with the one or more other APs of the AP MLD based on whether the group-addressed management frames are buffered at the one or more other APs of the AP MLD, wherein the TIM element includes a single bit for each AP of the AP MLD to indicate a presence of both buffered group-addressed data frames and the buffered group-addressed management frames at the AP and the one or more other APs of the AP MLD.

7. The method of claim 6, wherein:

the DTIM beacon further comprises a multi-link traffic indication element associated with the group-addressed management frames, and the multi-link traffic indication element indicating a link on which the non-AP MLD should attempt to receive the group-addressed management frames.

8. The method of claim 7, wherein the multi-link traffic indication element incudes a group-addressed management traffic indication field indicating a presence of buffered group-addressed management frames at the one or more other APs of the AP MLD.

9. The method of claim 6, wherein:

the DTIM beacon further comprises a multi-link traffic indication element associated with the group-addressed management frames, and the multi-link traffic indication element indicating whether a cross-link group addressed frame indication will be provided by the AP MLD.

10. The method of claim 6, wherein a bit indicating whether a cross-link group addressed frame indication will be provided by the AP MLD is included in a beacon frame or in a probe response frame received from the AP MLD.

11. An access point (AP) multi-link device (MLD) comprising:

an AP comprising a transceiver; and a processor operably coupled to the transceiver, the processor configured to:

generate a delivery traffic indication message (DTIM) beacon, the DTIM beacon comprising a traffic indication map (TIM) element;

determine whether group-addressed management frames are buffered at one or more other APs of the AP MLD; and configure the TIM element based on whether the group-addressed management frames are buffered at the one or more other APs of the AP MLD, wherein the TIM element includes a single bit for each AP of the AP MLD to indicate a presence of both buffered group-addressed data frames and the buffered group-addressed management frames at the AP and the one or more other APs of the AP MLD, and wherein the transceiver is configured to transmit the TIM element to a station (STA) of a non-AP MLD.

12. The AP MLD of claim 11, wherein:

the DTIM beacon further comprises a multi-link traffic indication element associated with the group-addressed management frames, and the multi-link traffic indication element indicating a link on which the STA should attempt to receive the group-addressed management frames.

13. The AP MLD of claim 12, wherein the multi-link traffic indication element incudes a group-addressed management traffic indication field indicating a presence of buffered group-addressed management frames at the one or more other APs of the AP MLD.

14. The AP MLD of claim 11, wherein:

the DTIM beacon further comprises a multi-link traffic indication element associated with the group-addressed management frames, and the multi-link traffic indication element indicating whether a cross-link group addressed frame indication will be provided by the AP MLD.

* * * * *